July 28, 1953  L. P. LOCKE  2,646,788
ROTARY GAS BURNER
Filed Nov. 26, 1949  2 Sheets-Sheet 1

INVENTOR.
Louis P. Locke
BY Charles Shepard
Attorney

INVENTOR.
Louis P. Locke
BY Charles Shepard
Attorney

Patented July 28, 1953

2,646,788

UNITED STATES PATENT OFFICE 2,646,788

ROTARY GAS BURNER

Louis P. Locke, Victor, N. Y.

Application November 26, 1949, Serial No. 129,634

1 Claim. (Cl. 126—39)

This invention relates to cooking and to cooking stoves and it has for its broad object to provide an apparatus for transferring heat from a prime heating source beneath the bottom of a cooking utensil in such manner as to distribute it more effectively over that surface and the food contents and reduce the danger of damaging the latter.

A more specific object of the invention is the provision of a gas burner so designed and constructed as to greatly increase the efficiency and evenness of transfer of heat from the flame to the vessel or other article being heated.

Another object of the invention is the provision of a gas burner so designed and constructed that when it is used for food cooking purposes, food which is ordinarily, for the sake of safety, cooked in a double boiler, may be safely cooked in a single saucepan or other cooking utensil, without substantial danger of scorching. Thus thick cereals, such as oatmeal, which are almost invariably cooked in a double boiler because of the danger of scorching, may safely be cooked in an ordinary single-walled saucepan when using the burner of the present invention.

A further object is the provision of a domestic gas burner having means for slowly moving the gas flame relative to the surface of the cooking utensil, so that the direct intense heat of the flame does not long remain at any one point of the cooking utensil, thus eliminating the need for the more expensive copper clad cooking vessels or other cooking vessels of special heat-conductive design.

These and other desirable objects are accomplished by the construction disclosed as an illustrative embodiment of the invention in the following description and in the accompanying drawings forming a part hereof, in which.

The same reference numerals throughout the several views indicate the same parts.

Figure 1:
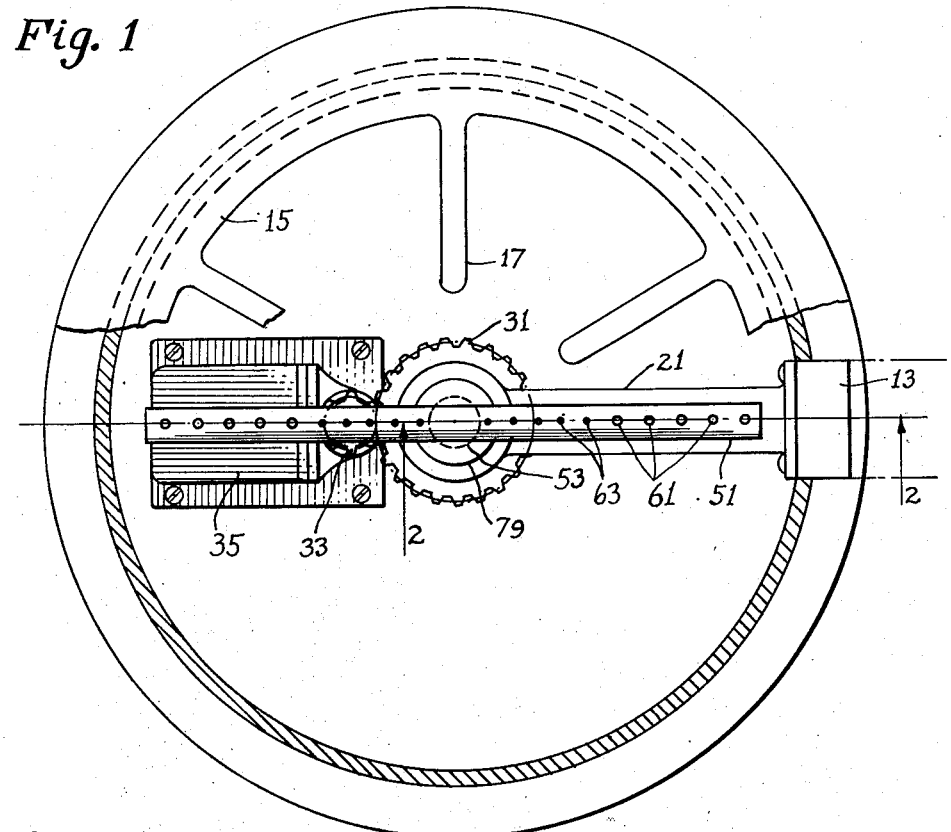
Fig. 1 is a plan, with parts broken away and parts in horizontal section, of a gas burner in accordance with a preferred embodiment of the present invention.
Figure 2:
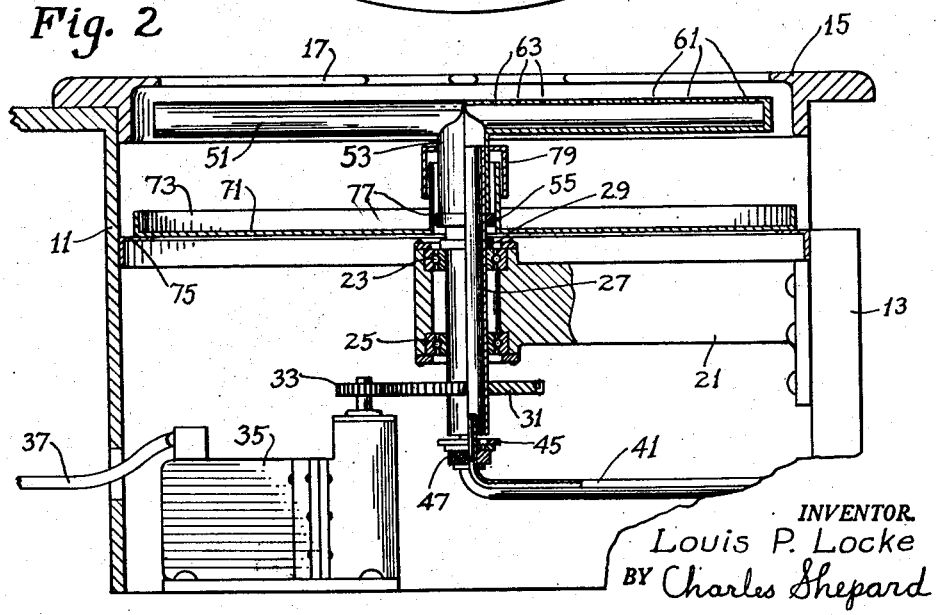
Fig. 2 is a vertical section through the same, taken substantially on the line 2—2 of Fig. 1, with certain parts shown for convenience in side elevation rather than in vertical section.

Referring first to Figs. 1 and 2, there is shown a fragment of a domestic gas kitchen range including frame parts 11 and 13 supporting the usual spider plate 15 with radial spider arms 17 for supporting the saucepan or other cooking utensil over the gas flame . This may be of any conventional construction.

Extending laterally from a fixed frame part 13 is the fixed bracket 21 which carries a pair of vertically alined ball bearings 23 and 25, the rotary axis of which coincides with the center of the utensil supporting spider 15, 17. A gas tube 27 is mounted in these bearings 23, 25 to rotate therein and to be supported by the bearings, support of the tube being enhanced by a collar 29 welded or otherwise secured on the tube in position to rest on the top surface of the upper ball bearing 23. Below the lower ball bearing 25, the tube 27 has fixed to it a spur gear 31 engaged with a pinion 33 which is driven by any suitable motor. When the range burns bottled gas at an isolated location where no electricity is available, the motor may be a spring motor, wound up by hand from time to time, the motor itself being of conventional design. Where electricity is available, it is usually preferred to employ a small fractional horsepower electric motor. In either case, the motor casing is indicated diagrammatically at 35, and if it is an electric motor, it may be supplied with electricity through a suitable electric cord 37.

Gas is led to the burner through the gas supply pipe 41, the rate of flow being controlled by any conventional gas valve (not shown) such as is commonly used on gas ranges. The tube 41 extends laterally to a position beneath the vertical tube 27, and then turns upwardly and extends a short distance up into the open bottom end of the tube 27, as well seen in Fig. 2. The tube 41 is of substantially smaller external diameter than the internal diameter of the tube 27, so that there is quite an air space between them. An air control or mixture control valve or shutter 45 is mounted on the upturned end of the tube 41 slightly below the bottom end of the tube 27, and the position of the valve or shutter 45 is controlled by the adjusting nut 47, all in well known manner, to regulate the amount of air which enters the lower end of the tube 27 at this point, in a manner well understood in the gas burner art. It is noted that there is no need for a gas-tight seal between the tubes 27 and 41, hence the junction between these tubes offers no friction whatever to rotation of the tube 27 in its bearings. The high velocity of exit of gas from the tube 41 into the tube 27 tends to create a partial vacuum at the lower end of the tube 27, drawing air in at this point, so there is no leakage of gas even though there is an open space rather than a seal between the tubes 27 and 41.

The actual burner tube or flame tube itself comprises in this preferred form, a horizontal tube 51 closed at both ends and having at its center a downwardly projecting short tubular portion 53 which fits over the upper end of the tube 27 and is supported from the latter. For example, the lower end of the tube 53 may rest upon a collar 55 which is welded or otherwise suitably secured around the tube 27 a little below the top end thereof. The tube 53 has a fairly snug fit on the tube 27, but not so tight as to prevent easy removal and replacement of the tube 51, 53 on the tube 27. The tube parts 51, 53, and 27 are preferably made of stainless steel, which has relatively low heat conductivity, so as to reduce the conduction of heat from the burner flames back to the other parts of the apparatus.

The burner tube 51 is provided on its upper surface with one or more rows of small holes from which the gas issues and at which it burns to form the flame. These holes are indicated at 61 and 63, the holes 61 closer to the extreme ends of the tube 51 being of somewhat larger size than the holes 63 closer to the center of the tube, to provide a greater quantity of heat toward the ends of the tube.

In case the food being cooked should boil over or otherwise be spilled, it is desirable to keep it from reaching the bearings, gears, motor, and other mechanism above mentioned, so there is provided, across the burner, at an elevation a little below the tube 51, a tray 71 which fits fairly closely inside the well or casing containing the burner, and has upturned flanges or marginal edges 73. This tray 71 rests loosely and removably on a supporting flange 75 which is fixed to the inner wall of the burner well or casing. The tube 27 extends up through a suitable opening in the tray 71, of course, and around this opening the tray has an upwardly extending collar or flange 77, higher than the marginal edge 73, so that if the tray becomes filled by spillage, it will overflow at the edges rather than at the center. Another collar or flange 79 in approximately the shape of an inverted cup, is rigidly secured to the downwardly extending tube 53 of the burner and is of slightly larger diameter than the upstanding flange 77 on the tray, so as to surround and overlap the latter, as plainly seen in Fig. 2. Since the flange 79 makes a tight fit with the tube 53 at the upper end of this flange, and since it encircles or embraces the tube 77, it is obvious that no food spilled near the center of the burner can get down inside the opening in the tray through which the vertical tube parts extend. When it is desired to clean the tray, the pot supporting spider 15, 17 is lifted upwardly off the top of the range as is customary in any gas range, and then the main burner tube 51 is lifted upwardly and taken off of the upper end of the rotary tube 27. Thereupon the tray 71 may be grasped and lifted upwardly and taken out of the range for cleaning, preferably being lifted by grasping the upstanding collar 77 at the center of the tray, which is readily accessible after the tube 51, 53 has been removed. The tray 71, after being cleaned, is first replaced; then the main burner tube 51, 53 is replaced on the top of the supporting tube 27.

In use, the pure gas mixture is supplied through the tube 41, and from this tube it enters the lower end of the tube 27, mixing with air at that point. Then the mixture of gas and air rises through the tube 27, into the main burner tube 51, issuing from the holes 61 and 63, where it is ignited. The motor 35 turns the tube 27 continuously while the burner is in operation, at a slow rate preferably about twelve complete revolutions per minute. The tube 51, 53 turns with the tube 27, since it rests directly on the tube 27 and thus is frictionally coupled to it. There is no resistance to the turning of the tube 51, 53 except the air resistance, which is negligible, and which is easily overcome by the frictional coupling between the tube 53 and the tube 27.

Because of the constant slow rotation of the burner tube 51 from which the flame jets issue, no flame stays continuously at any one point on the bottom of the cooking utensil. On the contrary, the line of flames coming from the individual burner holes acts like a brush being gently brushed across the bottom of the cooking pot, each flame constantly moving to a new location of fresh oxygen, and the motion of the burner causes the flames to waver somewhat in radial directions as well as moving circumferentially, so that the evenness of heating is enhanced. The constant motion of the flames over the bottom of the cooking utensil has the effect of heating all parts of the cooking utensil bottom evenly, as distinguished from the conventional gas burner arrangement where the flames are stationary and where the bottom of the cooking utensil is heated very hot at points directly over the flames and it is comparatively cool in the intervening spaces between the various radial rows or other rows of flames as patterned in the conventional domestic gas burner. Actual tests show that the rotating gas burner of the present invention is highly successful in cooking delicate sauces and even thick pasty foods like oatmeal, in a single saucepan, whereas with a conventional gas burner it is almost essential to use a double boiler.

Another advantage of the present invention is that since the burner tube 51, 53 is of relatively simple construction, it is inexpensive to make, and therefore the housewife may be provided, without incurring undue cost, with a set of burner tubes of various different lengths. When a cooking utensil of smaller or larger size is to be used on the stove, it is but the work of a moment to remove the burner tube 51, 53 and replace it with another similar burner tube of a different length approximately equal to the smaller or larger diameter of the cooking utensil which is to be used. Thus there is avoided the great waste of heat which is inherent in the conventional gas burner when used with a very small saucepan much smaller than the diameter of the burner, or the inefficient heating which is inherent in using the conventional gas burner with a large cooking utensil of considerably larger diameter than the burner. With conventional gas burners, the burner head itself is too expensive to make, and too difficult to take out and insert, to make it practical and feasible to supply the housewife with various burner heads of different diameters. But with the very simple, light, and inexpensive burner tube of the present invention, it is entirely practical and feasible to supply several burner tubes of different lengths, for use with cooking utensils of different diameters, so that the area of heat provided by the burner tube matches the area of the bottom of the utensil fairly closely, thus giving greatly increased efficiency.

It is not essential that the flame tube or main burner tube have only two arms (in other words, a single diametrical tube). It may have three or four or more arms, if desired. A flame tube 81 of cross shape, having four arms, is shown diagrammatically in Fig. 3, and a flame tube 85, having three arms, is shown diagrammatically in Fig. 4. In each case, the flame tube has, at its center, the same downwardly projecting tube 53 and skirt 79 as previously described.

Since the flame tubes are so easily removable, as already mentioned, it is seen that the cooking range may be provided with some three-arm or four-arm flame tubes, as well as the simpler form of two-arm or diametrical flame tubes. The three-arm or four-arm tube will give faster heating and may be used safely on relatively thin liquids such as thin soups, or for boiling plain water in a tea kettle more rapidly than can be done with the two-arm tube. The two-arm tube is preferably used when cooking thicker foods or more delicate foods, such as cereals, thick sauces, etc.

Figure 3:
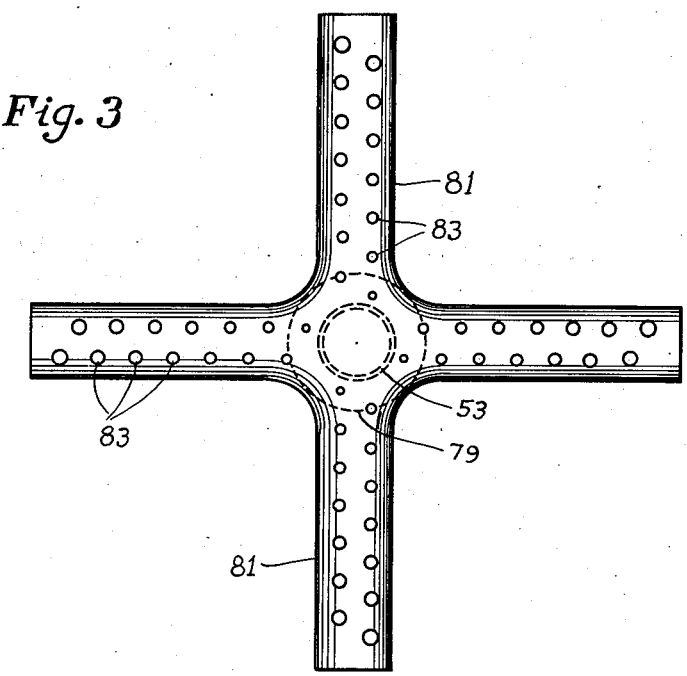
Fig. 3 is a plan of a modified form of burner tube according to the present invention.
Figure 4:
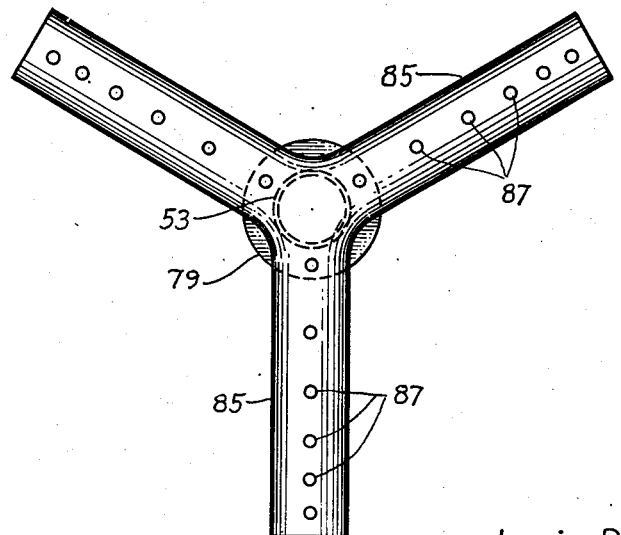
Fig. 4 is a similar plan of another modified form of burner tube.

As already mentioned, the flame holes may extend in one or more rows along each arm of the flame tube. In Fig. 3, the holes 83 are shown in two rows, as an example of this practice, and the same may be done with the other flame arms, if desired, although only single rows of holes in each arm are shown in Figs. 1 and 4.

It has already been indicated that it is preferable to provide a greater concentration of heat near the outer ends of the rotating flame arms, than near the center of rotation. This is because any given increment of length near the outer end of the flame arm, has to supply heat to a greater area of the bottom of the cooking pot, during each revolution, than the same length of flame arm at a point closer to the center of rotation. This greater heat concentration toward the outer ends of the arms may be accomplished either by varying the sizes of the holes from which the individual gas jets issue, or by varying the spacing of such holes, or by a combination of both. For example, as shown in Fig. 1, two different sizes of holes may be used, the five holes closest to the center being of one size and the five holes closest to the end being of a somewhat larger size, as well seen in Fig. 1.

Or again, as seen in Fig. 3, many different sizes of holes may be used, growing progressively larger from the center towards the outer ends of the arms. The difference in size between any two adjacent holes 83 in Fig. 3 is scarcely noticeable, but by comparing each hole with a hole some distance away, it will be seen that there is a progressive increase in the size of the holes. Or again, in the arrangement shown in Fig. 4, the holes 87 are all of the same size, but the spacing is varied, the holes near the outer ends of the arms being relatively close together, and the spacing being progressively greater at points closer to the center of rotation. Any of these arrangements for varying the heating effect at different points on the flame arms or burner arms, may be used regardless of how many flame arms are employed. The differential heating effect along the lengths of the flame arms is especially helpful with relatively long flame arms, for use on cooking pots of large diameter, but it may also be used, if desired, on relatively short flame arms intended for small cooking pots. For the sake of simplification and economy, it is frequently desirable to omit the refinement of differential heating when the flame arms are relatively short, however, and use this refinement only on the longer flame arms.

An important factor is the provision of power means for rotating the burner independently of the rate of flow of fuel to the burner. Thus the burner continues to rotate even when the flame is turned very low. If the reaction force of the flow of fuel were relied upon to turn the burner, then the rotation would stop when the burner were turned low, just as rotation of a reaction type lawn sprinkler stops when the flow of water is turned very low. But with the present motor driven arrangement, rotation continues even when the flame is turned very low as in simmering, so that there is no danger of continued concentrated heat at one spot.

This rotating burner construction is very useful in producing great evenness of heating and great efficiency of heat transfer wherever it is desired to use such construction, as in a water heater, a furnace, a boiler, or in commercial food processing equipment as in restaurants and food factories. Domestic or household cooking has been mentioned above merely as a convenient example.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claim.

I claim:

A domestic cooking stove for cooking with gas fuel, comprising a stationary frame having a support for a cooking utensil, a stationary gas supply pipe terminating in an upwardly directed discharge end beneath said support, a rotatably mounted tube extending substantially vertically, bearings operatively interposed between said frame and said tube for supporting said tube in rotatable relation to said frame, the lower end of said tube loosely embracing the upper end of said supply pipe in spaced and non-contacting relation thereto to provide a free space for entrance of air between said supply pipe and said tube, a motor for turning said tube relatively slowly about its substantially vertical axis, a burner structure having at least two horizontal and approximately radial tubular arms with holes in their upper sides for escape of gas and a centrally disposed downwardly extending neck tube detachably slidable onto the upper end of said vertical tube to support said burner structure from said vertical tube and to guide the flow of gas from said vertical tube into said horizontal arms of said burner structure, said burner structure when in normal operative position on said tube being located beneath said support so that the burning of gas issuing from said holes is adapted to supply heat to a cooking utensil resting on said support, said burner structure turning with said tube so that the heat will be supplied to successively different parts of the bottom of said cooking utensil, a tray extending approximately horizontally at an elevation below said radial arms, said tray having a central opening through which said rotatable tube passes freely and having an upstanding collar making a tight joint with said tray at its bottom and spaced radially from said rotatable tube, and an inverted cup-shaped collar tightly joined at its upper end to said neck tube at an elevation above the top of said first mentioned collar and extending downwardly externally of said first mentioned collar in overlapping and radially spaced relation thereto, to guard against flow of spilled material downwardly along said neck tube and vertical tube and into said bearings.

LOUIS P. LOCKE.

References Cited in the file of this patent

UNITED STATES PATENTS

| Number | Name | Date |
|---|---|---|
| 2,266,627 | Ehret | Dec. 16, 1941 |
| 2,327,512 | Dennis | Aug. 24, 1943 |
| 2,372,362 | Dawson | Mar. 27, 1945 |
| 2,428,032 | Moscrip | Sept. 30, 1947 |
| 2,517,661 | Hart | Aug. 8, 1950 |

FOREIGN PATENTS

| Number | Country | Date |
|---|---|---|
| 7,711 | Great Britain | Nov. 30, 1901 |
| 103,419 | Great Britain | Jan. 25, 1917 |
| 375,945 | Germany | May 19, 1923 |
| 381,759 | Germany | Sept. 24, 1923 |